(12) United States Patent
Jackson

(10) Patent No.: US 9,176,785 B2
(45) Date of Patent: Nov. 3, 2015

(54) SYSTEM AND METHOD FOR PROVIDING MULTI-RESOURCE MANAGEMENT SUPPORT IN A COMPUTE ENVIRONMENT

(75) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 2197 days.

(21) Appl. No.: 10/530,576

(22) PCT Filed: Mar. 11, 2005

(86) PCT No.: PCT/US2005/008289
§ 371 (c)(1),
(2), (4) Date: Jul. 29, 2008

(87) PCT Pub. No.: WO2005/089240
PCT Pub. Date: Sep. 29, 2005

(65) Prior Publication Data
US 2012/0226788 A1    Sep. 6, 2012

Related U.S. Application Data

(60) Provisional application No. 60/552,653, filed on Mar. 13, 2004.

(51) Int. Cl.
*G06F 15/173*    (2006.01)
*G06F 15/16*    (2006.01)
*G06F 9/50*    (2006.01)

(52) U.S. Cl.
CPC .............. *G06F 9/5072* (2013.01); *G06F 9/505* (2013.01); *G06F 2209/503* (2013.01); *G06F 2209/506* (2013.01); *G06F 2209/508* (2013.01); *G06F 2209/5014* (2013.01); *G06F 2209/5015* (2013.01); *G06F 2209/5022* (2013.01)

(58) Field of Classification Search
CPC ... G06Q 10/06; G06Q 10/063; H04L 67/1008
USPC .................................................. 709/223–227
See application file for complete search history.

(56) References Cited

U.S. PATENT DOCUMENTS

| | | | | |
|---|---|---|---|---|
| 6,041,056 | A * | 3/2000 | Bigham et al. | 370/395.64 |
| 6,308,163 | B1 * | 10/2001 | Du et al. | 705/7.25 |
| 6,560,609 | B1 * | 5/2003 | Frey et al. | 709/223 |
| 6,760,733 | B1 * | 7/2004 | Komine et al. | 1/1 |
| 6,760,910 | B2 * | 7/2004 | Eilert et al. | 709/223 |

(Continued)

OTHER PUBLICATIONS

Jette et al., "SLURM: Simple Linux Utility for Resource Management," *Lawrence Livermore National Laboratory*, USA, 2003.

*Primary Examiner* — Minh-Chau Nguyen

(57) ABSTRACT

The invention comprises systems, methods and computer-readable media for providing multiple-resource management of a cluster environment. The method embodiment of the invention is illustrative and comprises, at a cluster scheduler, defining a resource management interface, identifying a location of a plurality of services within the cluster environment, determining a set of services available from each of the plurality of resource managers, selecting a group of services available from the plurality of resource managers, contacting the group of services to obtain full information associated with the computer environment and integrating the obtained full information into a single cohesive world-view of compute resources and workload requests.

32 Claims, 6 Drawing Sheets

(56) References Cited

U.S. PATENT DOCUMENTS

| | | | |
|---|---|---|---|
| 6,766,365 B1 * | 7/2004 | Huang et al. | 709/223 |
| 7,061,923 B2 * | 6/2006 | Dugan et al. | 709/223 |
| 7,225,249 B1 * | 5/2007 | Barry et al. | 709/227 |
| 2002/0120741 A1 | 8/2002 | Webb et al. | |
| 2003/0014468 A1 * | 1/2003 | Sudhakaran et al. | 709/104 |
| 2003/0233446 A1 | 12/2003 | Earl | |
| 2004/0139202 A1 | 7/2004 | Talwar et al. | |
| 2004/0199918 A1 | 10/2004 | Skovira | |
| 2004/0244006 A1 | 12/2004 | Kaufman et al. | |
| 2005/0021487 A1 * | 1/2005 | Verma et al. | 707/1 |
| 2005/0204040 A1 * | 9/2005 | Ferri et al. | 709/225 |
| 2005/0278760 A1 | 12/2005 | Dewar et al. | |

* cited by examiner

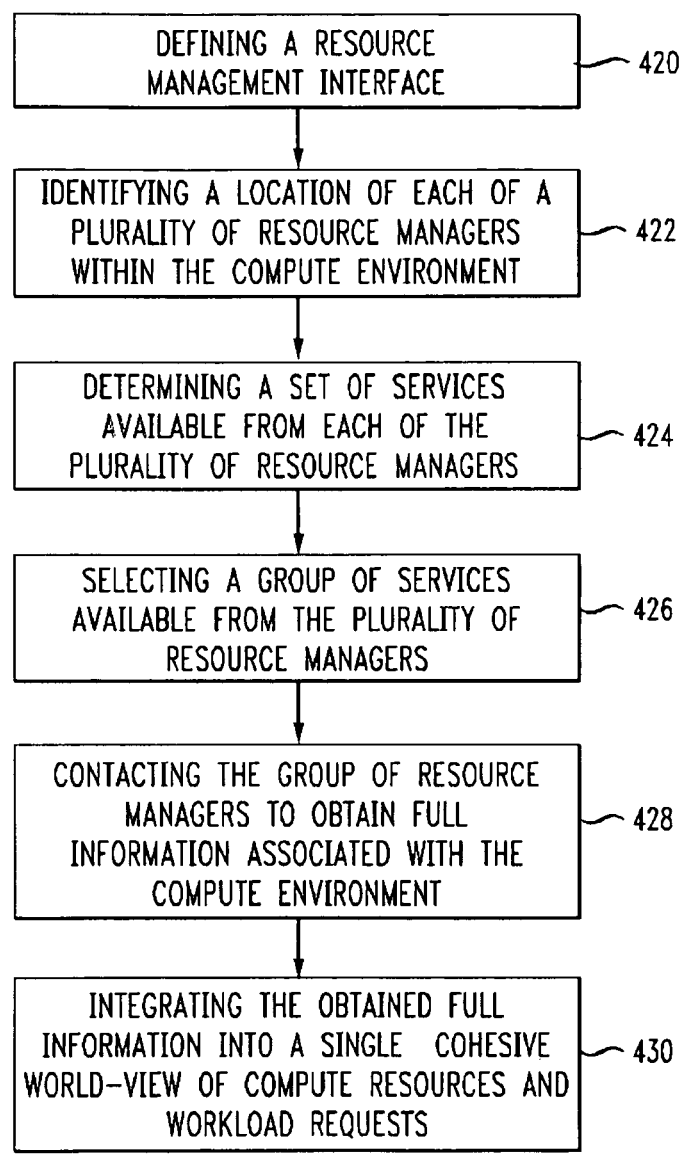

SYSTEM AND METHOD FOR PROVIDING MULTI-RESOURCE MANAGEMENT SUPPORT IN A COMPUTE ENVIRONMENT

PRIORITY CLAIM

The present application claims priority to U.S. Provisional Application No. 60/552,653 filed Mar. 13, 2004, the contents of which are incorporated herein by reference.

RELATED APPLICATIONS

The present application is related to U.S. patent application Ser. No. 10/530,583; U.S. patent application Ser. No. 10/530,582; U.S. patent application Ser. No. 10/530,581; U.S. patent application Ser. No. 10/530,577; U.S. patent application Ser. No. 10/589,339; U.S. patent application Ser. No. 10/530,578; U.S. patent application Ser. No. 10/530,580; and U.S. patent application Ser. No. 10/530,575; filed on the same day as the present application. The content of each of these cases is incorporated herein by reference.

BACKGROUND OF THE INVENTION

1. Field of the Invention

The present invention relates to managing resources in a compute environment and more specifically to a system and method of querying and controlling resources in a compute environment such as a multi-cluster environment.

2. Introduction

Grid computing may be defined as coordinated resource sharing and problem solving in dynamic, multi-institutional collaborations. Many computing projects require much more computational power and resources than a single computer may provide. Networked computers with peripheral resources such as printers, scanners, I/O devices, storage disks, scientific devices and instruments, etc. may need to be coordinated and utilized to complete a task.

Grid/cluster resource management generally describes the process of identifying requirements, matching resources to applications, allocating those resources, and scheduling and monitoring grid resources over time in order to run grid applications as efficiently as possible. Each job submitted for processing will utilize a different set of resources and thus is typically unique. In addition to the challenge of allocating resources for a particular job, grid administrators also have difficulty obtaining a clear understanding of the resources available, the current status of the grid and available resources, and real-time competing needs of various users. General background information on clusters and grids may be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable in that there is no specific definition of either. The definition of a grid is very flexible and may mean a number of different configurations of computers. The introduction here is meant to be general given the variety of configurations that are possible. In general, a grid will comprise a plurality of clusters as is shown in FIG. 1. Several general challenges exist when attempting to maximize resources in a grid. First, there are typically multiple layers of grid and cluster schedulers. A grid 100 generally comprises a group of clusters 110, 112 or a group of networked computers. A grid scheduler 102 communicates with a plurality of cluster schedulers 104A, 104B and 104C. Each of these cluster schedulers communicates with a plurality of resource managers 106A, 106E and 106C. Each resource manager communicates with a series of compute resources shown as nodes 108A, 108B, 108C within cluster 110 and 108D, 108E, 108F in cluster 112.

There are various vendors of resource managers 106A, 106B, 106C that require differing means of communication to and from the resource manager. For example, one resource manager vendor may have software that only communicates with certain types of compute resources, such as MicroSoft or Linux operating systems, hard drives using certain protocols and so forth. This can cause challenges when a cluster includes a variety of cluster resource managers in order to communicate with these differing products.

Other challenges of the model shown in FIG. 1 exist as well. Local schedulers (which may refer to either the cluster schedulers 104 or the resource managers 106) are closer to the specific resources 108 and may not allow grid schedulers 102 direct access to the resources. Examples of compute resources include data storage devices such as hard drives and computer processors. The grid level scheduler 102 typically does not own or control the actual resources. Therefore, jobs are submitted from the high level grid-scheduler 102 to a local set of resources with no more permissions that then user would have. This reduces efficiencies.

Another issue that reduces efficiency is the heterogeneous nature of the shared resources. Without dedicated access to a resource, the grid level scheduler 102 is challenged with the high degree of variance and unpredictability in the capacity of the resources available for use. Most resources are shared among users and projects and each project varies from the other.

Furthermore, the performance goals for projects differ. Grid resources are used to improve performance of an application but the resource owners and users have different performance goals: from optimizing the performance for a single application to getting the best system throughput or minimizing response time. Local policies may also play a role in performance.

A bottleneck in the middleware component of the cluster or grid environment is the difficulty in communication and managing the diverse compute resources. If the clusters 110 and 112 include a group of compute resources that have diverse communication protocols and requirements across different resource managers 106A, 106B, 106C, then a cluster manager or company establishing or provisioning a cluster may need to purchase or license multiple resource managers to communication and assign jobs to all the compute resources.

FIG. 2 illustrates the prior art in more detail. Typically the cluster scheduler 104A communicates with only one resource manager server 106A. The resource manager server 106A retrieves data from a number of resource manager clients 120A, 120B, 120C that are located on each of the compute hosts 122A, 122B, 122C within a respective cluster node 108A, 108B, 108C. The clients 120A, 120B, 120C obtain information regarding the state of the node 108A, 108B, 108C, the load on the node, the configuration of the node, and similar properties.

This model is acceptable for simple clusters but it has a number of problems. A primary problem in this scenario is that the cluster scheduler's view of the compute resources is bound by the resource manager server 106A and it is not able to obtain any information that is not contained within the resource manager 106A. The cluster scheduler 104A is not able to take any action that is not within the scope of the communication and control capabilities of the resource manager 106A. For an end user or a customer site, they are bound to select a single resource manager and are unable to pick and choose one resource manager combined with the features of another. The standard resource manager 106A is designed on a locked-in model and purchasers must simply find the best resource manager with the combination of features and purchase it or look to purchasing and incorporating multiple and diverse resource managers to meet all their needs.

What is needed in the art is a way of allowing a scheduler to contact multiple sources of information and multiple sources of control so that an end user site can pick and choose which groupings of services to utilize from multiple sources. What is further needed in the art is an improved method and system for managing the disparate compute resources at a single location within the context of a cluster environment where there are a variety of cluster resource managers and a variety of compute resources.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the need in the art for a workload manager that can obtain configuration and state data and can control the state and activities of multiple resources in a cluster from multiple services. A workload manager utilizes the services of a resource manager to obtain information about the state of compute resources (nodes) and workload (jobs). The workload manger can also use the resource manager to manage jobs, passing instructions regarding when, where, and how to start or otherwise manipulate jobs. Using a local queue, jobs may be migrated from one resource manager to another.

The invention comprises systems, methods and computer-readable media for providing multiple-resource management of a cluster environment. The method embodiment of the invention comprises, at a cluster or grid scheduler, defining a resource management interface, identifying a location of a plurality of services within the cluster environment, determining a set of services available from each of the plurality of resource managers, selecting a group of services available from the plurality of resource managers, contacting the group of services to obtain full information associated with the computer environment and integrating the obtained full information into a single cohesive world-view of compute resources and workload requests.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4B illustrates another method aspect of the invention;

DETAILED DESCRIPTION OF THE INVENTION

Figure 1:
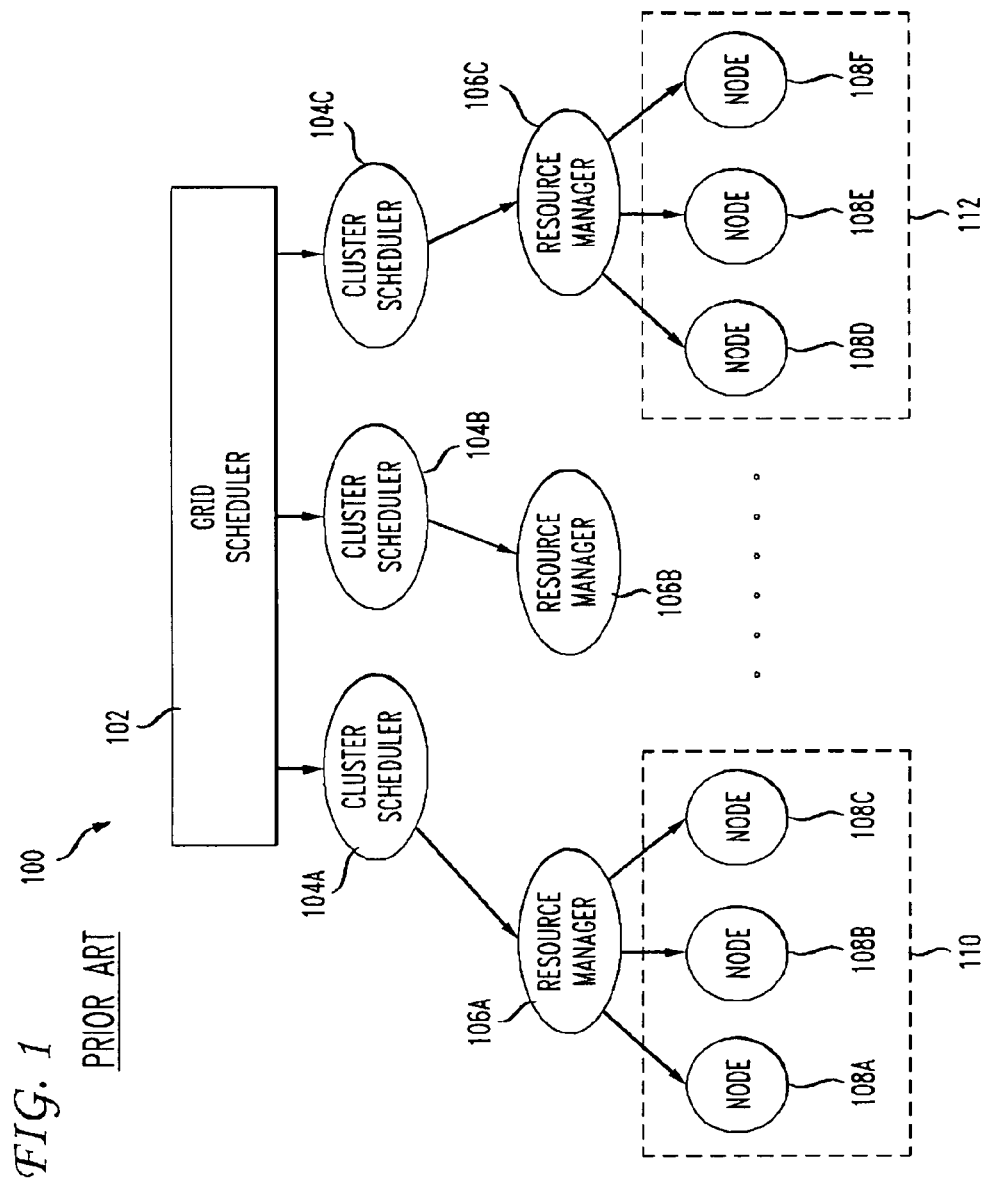
FIG. 1 illustrates generally a grid scheduler, cluster scheduler, and resource managers interacting with compute nodes.
Figure 2:
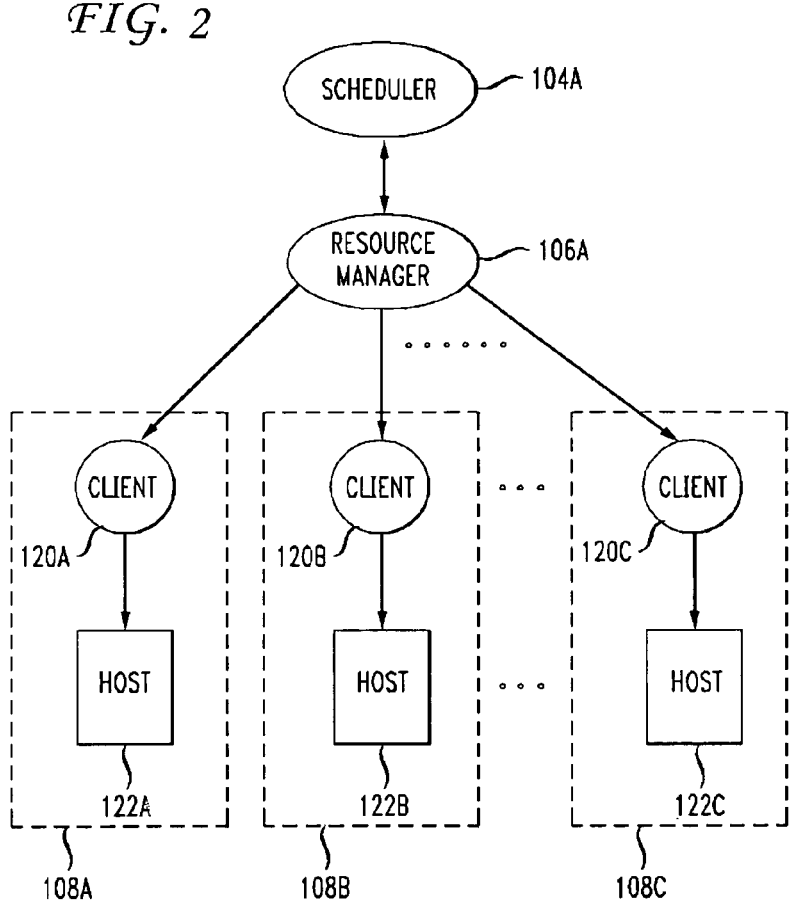
FIG. 2 illustrates in more detail a singe cluster scheduler communicating with a single resource manager.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention addresses the deficiencies in the prior art and provides systems and methods for querying and controlling state and configuration information for cluster resources. The "system" embodiment of the invention may comprise a computing device that includes the necessary hardware and software components to enable a workload manager or a software module performing the steps of the invention. Such a computing device may include such known hardware elements as one or more central processors, random access memory (RAM), read-only memory (ROM), storage devices such as hard disks, communication means such as a modem or a card to enable networking with other computing devices, a bus that provides data transmission between various hardware components, a keyboard, a display, an operating system and so forth. There is no restriction that the particular system embodiment of the invention has any specific hardware components and any known or future developed hardware configurations are contemplated as within the scope of the invention when the computing device operates as is claimed. The systems aspect of the invention may also comprise clusters, grids, servers, utility based computing centers, hosting center, data centers and workload managers or schedulers that perform the steps of the invention.

A cluster scheduler using the principles of this invention is not restricted to any particular resource manager. The term cluster scheduler may refer to a workload manager, a grid scheduler, or any scheduling or management component in any layer within a grid or cluster system. Preferably, the cluster schedule is feature 302 of FIG. 3, but the functionality of the scheduler may operate at other layers as well.

The scheduler can receive and process multiple sources of information for more intelligent resource management and scheduling. Within a cluster, grid or utility-based computing environments, decisions on what resources to use and when to use them are often determined by information provided by a compute resource manager such as Loadleveler, LSF, Open-PBS, TORQUE, PBSPro, BProc and others which provide basic status about a node and which can be used to submit job requests to a compute node. Information on each of these produces and other resource managers may be obtained from the Internet or from the vendors. The present invention enables support for multiple standard resource manager interface protocols based on these different products. Those of skill in the art will recognize how these compute resource managers interact with the compute resources and cluster or grid schedulers.

Other benefits that are available through use of the present invention include support for multiple simultaneous resource managers. A scheduler using the principles of the present invention can integrate resource and workload streams from multiple independent sources reporting disjoint sets of resources. The scheduler according to an aspect of the invention can allow one system to manage a workload (queue manager) another to manage your resources. The scheduler can support rapid development interfaces with load resource and workload information obtained directly from a file, a URL, or from the output of a configurable script or other executable. The scheduler can also provide resource extension information by integrating information from multiple sources to obtain a cohesive view of a compute resource (i.e., mix information from NIM, OpenPBS, FlexLM, and a cluster performance monitor to obtain a single node image with a coordinated state and a more extensive list of node configuration and utilization attributes). The invention enables support for generate resource manager interfaces to manage cluster resources securely via locally developed or open source projects using simple flat text interfaces or XML over HTTP. These benefits and advantages are not considered limitations on the principles of the invention unless expressly set forth in the claim set below.

Compute resource managers like those introduced above are able to provide node state information to help make workload decisions. The inclusion of additional resource managers that, collect additional types of information such as attributes and status of storage resources, or software licenses or network bandwidth, files sizes, or any number of data points about any type of resource, whether it be consumable or non-consumable, can be incorporated into resource policy and scheduling decisions by a given tool. Resource managers may be formally known as such or they may be as simple as a one or two-line script designed to gather a particular piece of information. The ability to manage multiple types of resources simultaneously to make more intelligent policy and scheduling decisions as well as report additional information is one aspect of multi-resource management.

Figure 3:
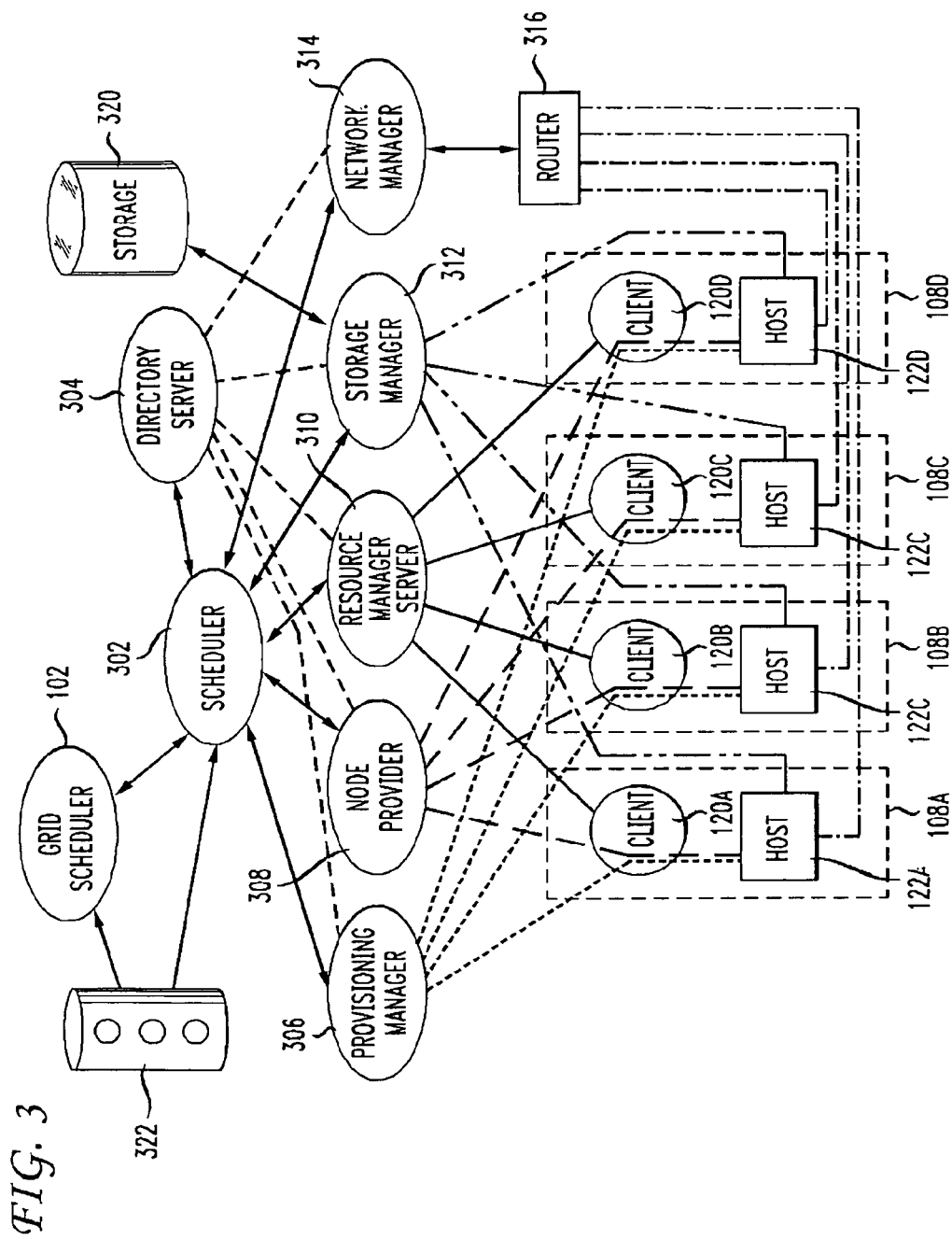
FIG. 3 illustrates an architectural embodiment of the invention.
Figure 4A:
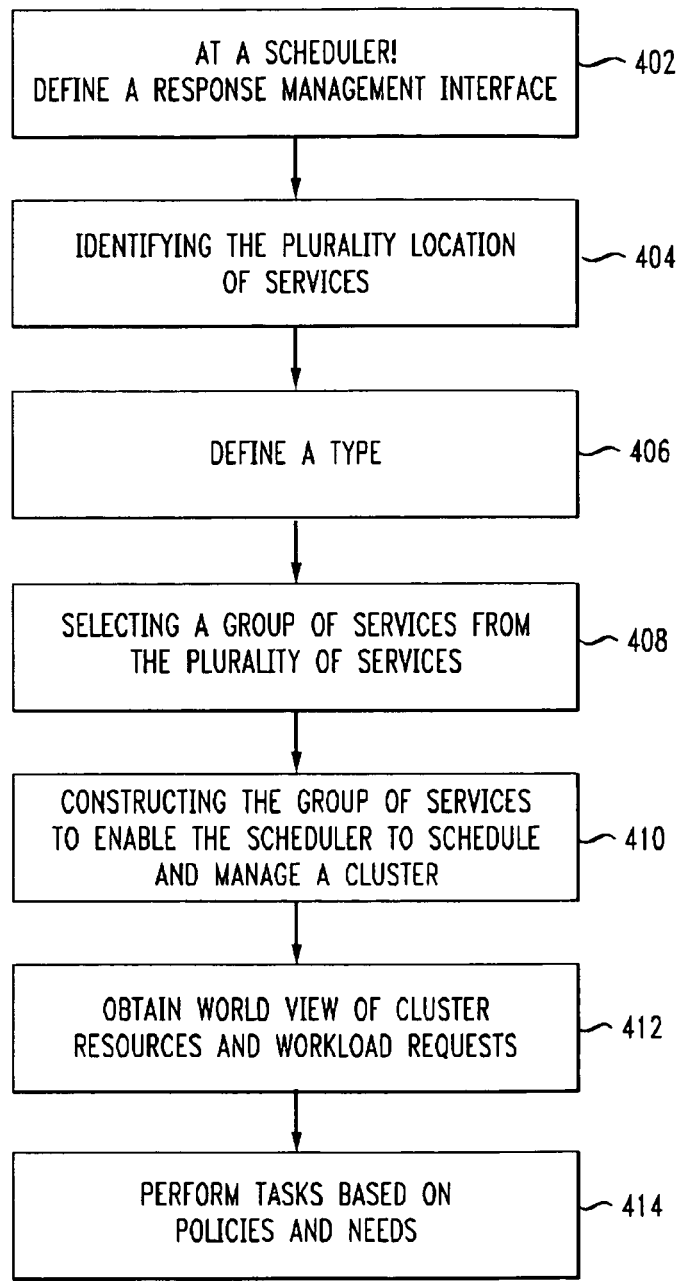
FIG. 4A illustrates a method embodiment of the invention.

With reference to FIGS. 3 and 4, the basic principles of the system and method embodiments of the invention are introduced. In the context of this disclosure, each of the services 306, 308, 310, 312 and 314 may be referred to generally as a "resource manager", or more specifically according to the particular service they provide, such as a provision manager 306 that manages provisioning-related processes on the cluster or a storage manager 312 that communicates with and manages data storage 320. One aspect of the invention comprises within a cluster scheduler 302, defining a resource management interface (402).

The cluster scheduler 302 must interface with numerous resource management systems 310. Some of the resource managers 310 interact through a resource manager specific interface (i.e., OpenPBS/PBSPro, Loadleveler, SGE) while others interact through generalized interfaces such as SSS or Wiki. Those of skill in the art will understand these generalized interfaces and no more detail is provided herein.

For most resource managers, either route is possible depending on where it is easiest to focus development effort. Use of Wiki generally requires modifications on the resource manager side while creation of a new resource manager specific interface would require more changes to modules in the cluster scheduler. If a scheduling API already exists within the resource manager, creation of a resource manager specific scheduler interface is often selected.

The specific interfaces for several resource managers are discussed next to provide an example of how to define the resource management interface. If the resource manger specific interface is desired, then typically a scheduling API library/header file combo is desirable (i.e., for PBS, libpbs.a+ pbs_ifl.h, etc.). This resource manager-provided API provides calls which can be linked into the workload manager 302 to obtain the raw resource manager data including both jobs and compute nodes. Additionally, this API should provide policy information about the resource manager configuration if it is desired that such policies be specified via the resource manager rather than the scheduler and that the workload manager 302 will know of and respect these policies.

A module (such as the 'M<X>I.c' module) is responsible for loading information from the resource manager, translating this information, and then populating the appropriate scheduler data structures. The existing modules (such as the MLLI.c, MPBSI.c and MWikiI.c modules) provide templates indicating how to do this. These may be obtained from the Internet or the respective vendor.

There are two steps associated with configuring an interface in a scheduler 302. The first step involves mentioning or identifying the location of various services in the environment (404) and a port and a protocol being used. The cluster environment may be at least one of a local area grid, data centers, wide area grid, cluster scheduler utility based computing environment and hosted centers. The host, port and server attributes can be used to specify how the resource manager 320 should be contacted. For many resource managers (i.e., OpenPBS, PBSPro, Loadleveler, SGE, LSF, etc) the interface correctly establishes contact using default values. These parameters need only to be specified for resource managers such as the WIKI interface (which do not include defaults) or with resources managers which can be configured to run at non-standard locations (such as PBS). In all other cases, the resource manager is automatically located.

The maximum amount of time the scheduler 302 will wait on a resource manager 310 call can be controlled by a timeout parameter which defaults to 30 seconds or any other desired amount. The authtype attribute allows specification of how security over the scheduler/resource manager interface is to be handled.

Another resource manager configuration attribute is CONFIGFILE, which specifies the location of the resource manager's primary con fig file and is used when detailed resource manager information not available via the scheduling interface is required. The NMPORT attribute allows specification of the resource manager's node manager port and is only required when this port has been set to a non-default value.

FIG. 3 shows an example of various services, such as a provisioning manager 306, a node manager 308, the resource manager 310, a storage manager 312 and a network manager 314. Other services not shown are also contemplated, such as software licensing managers or script gathering managers. A second step is defining a type for each service (406). If the service under consideration is the resource manager 310, then the type may be the vendor or which resource manager is managing the cluster. Defining the type in this regard is accomplished by modifying a header file (such as moab.h) and a source code file (such as the MConst.c file) to define a new RMTYPE parameter value. For example, the resource manager type may be PBSPro, TORQUE or others. With this defined, a module (such as the MRMI.c module) must be modified to call the appropriate resource manager specific calls which will eventually be created within the 'M<X>I.c' module. This process is straightforward and involves extending existing resource manager specific case statements within the general resource manager calls.

The resource manager specific data collection and job management calls play an important role in the cluster scheduler 302. These calls populate data structures and are responsible for passing scheduler 302 scheduling commands on to the resource manager 310. The base commands are GetJobs, GetNodes, StartJob, and CancelJob but if the resource manager support is available, extended functionality can be enabled by creating commands to suspend/resume jobs, checkpoint/restart jobs, and/or allow support of dynamic jobs.

If the resource manager 310 provides a form of event driven scheduling interface, this feature will also need to be enabled. A module (such as the MPBSI.c module) provides a template for enabling such an interface within the MPBSProcessEvent( ) call.

The Wiki interface is a good alternative if the resource manager does not already support some form of existing scheduling API. For the most part, use of this API requires the same amount of effort as creating a resource manager specific interface but development effort focused within the resource manager. Since Wiki is already defined as a resource manager type, no modifications are required within the cluster scheduler 302. Additionally, no resource manager specific library or header file is required. However, within the resource manager 310, internal job and node objects and attributes must be manipulated and placed within Wiki-based interface concepts as defined by the interface. Additionally, resource manager parameters must be created to allow a site to configure this interface appropriately.

The SSS interface is an XML-based generalized resource manager interface. It provides an extensible, scalable, and secure method of querying and modifying general workload and resource information.

Defining the type of service may also mean, in a more general sense, which "type" of service is being analyzed. For example, in FIG. 3, there is a provisioning manager 306, node monitor 308, resource manager 310, storage manager 312 and network manager 314. The type may indicate the kind of service or monitoring that the particular service provides and any associated data.

A type scopes the information coming back to the scheduler 302 via the resource manager 310, and it also scopes, or constrains, the types of functionality that are available that can be provided by the resource manager 310 to the scheduler, within that resource manager object.

Another aspect of identifying the type relates to what type of service is being identified and categorized, such as a provisioning service, network manager, licensing service, and so forth.

The steps of defining a resource management interface and identifying locations of a plurality of services (404) and defining types (406) can either be performed manually by a network administrator or automatically by communicating between the scheduler and a directory service server 304. In the automatic model, the directory service 304 receives reports of their configuration and capabilities for each resource manager 310 and each service 306, 308, 312 and 314 instead of being configured in the scheduler 302. The scheduler 302 communicates with the directory service 304 and determines the types of service that the directory service has detected and identified. The scheduler than selects the desired service and the directory service 304 contacts the services 306, 308, 310, 312 and/or 314 which can enable the scheduler 302 to schedule and manage the cluster.

The scheduler 302 interacts with all resource managers 310 (and other services) using a common set of commands and objects. In the simplest configuration, the four primary functions are GETJOBINFO that collects detailed state and requirement information about idle, running, and recently completed jobs; GETNODEINFO that collects detailed state information about idle, busy, and defined nodes; STARTJOB that immediately starts a specific job on a particular set of nodes; and CANCELJOB Immediately cancel a specific job regardless of job state. Using these four commands, the scheduler 302 enables an entire suite of scheduling functions. In addition to these base commands, other commands may be utilized to support features such a dynamic job support, suspend/resume, gang scheduling, and scheduler initiated checkpoint restart.

Each resource manager interfaces, obtains and translates scheduler 302 concepts regarding workload and resources into native resource manager objects, attributes and commands.

This is an automatic method using directory server 304 to communicate with each of the resource managers. In a simple configuration it is preferable to do the manual approach in a more complex configuration and a more dynamic situation using the directory server 304 method is preferable.

Once all the resource managers 306, 308, 310, 312 and 314 are configured, the scheduler 302 proceeds to obtain a full world view by pulling in information and workload requests from the various resource managers 306, 308, 310, 312 and 314 (412) and then performs a plurality of tasks based on policies and needs (414). Queue. 322 illustrates a job queue with a workload that may be submitted at the cluster scheduler 302 layer, the grid scheduler layer 102 or even to the resource manager 310. An example of a job submitted for processing on the cluster is a weather analysis on an upcoming tropical storm. A weather bureau may schedule the cluster every night at midnight for a large amount of processing resources to compute their weather analysis. The jobs may have policies and needs related to processing power, a required time to complete the job (for reporting the news at a certain time), and so forth. If the job is submitted to the scheduler 302, the scheduler 302 retrieves information from the various resource managers 306, 308, 310, 312, 314 and checks the queue 322, gathers all its information, and then instructs the resource manager 310 to process the job according to the direction from the scheduler 302 based on all the received information, policies and permissions. This processing may include re-provisioning the cluster environment or modifying the workload to meet the capabilities of the resources.

FIG. 4B illustrates another aspect of the method embodiment of the invention. In this aspect, a method of providing multiple-source resource management of a compute environment comprises defining a resource management interface (420), identifying a location of each of a plurality of resource managers within the compute environment (422), determining a set of services available from each of the plurality of resource managers (424), selecting a group of services available from the plurality of resource managers (426), contacting the group of resource managers to obtain full information associated with the compute environment (428) and integrating the obtained full information into a single cohesive worldview of compute resources and workload requests (430).

In the context above, determining a set of "services" available from each of the plurality of resource managers may also refer to determining a set of services and/or data available from each of a plurality of resource managers. As a system performs the systems set forth herein, each of the steps may be considered as being practiced by a "module" such as computer software code that is programmed to generally perform the recited step.

A lot of the services in FIG. 3 can modify the cluster to meet the needs of the workload 322. The provisioning manager 306 can change operating systems and software applications on nodes in the cluster. A node monitor 308 provides information about each node 108A, 108B, 108C, 108D upon a query. It simply returns the information as a query-only type object. The storage manager 312 will connect file systems that are required for a job.

For example, suppose a job requires a massive data set for storage and nodes 108A, 108B are allocated for the job, the storage manager 312 will associate that storage requirement that has the images needed with the assigned nodes 108A, 108B for that job. The network manager 312 can, for example, provide a virtual private network for security and a guaranteed bandwidth via a router 316 for inter-process communication. The network manager 314 communicates with the router 316 and the router 316 communicates with the nodes 108A, 108B, 108C, 108D in the cluster. The architecture in FIG. 3 is typically a single cluster unless the context is within a virtual private cluster, in which case it could simply be a partition within the larger cluster.

Table 1 illustrates example resource manager commands that relate to the interaction of the scheduler 302 with the resource manager 310.

TABLE 1

| Object | Function | Details |
|--------|----------|---------|
| Job | Query | Collect detailed state, requirement, and utilization information about jobs |
| Job | Modify | Change job state and/or attributes |
| Job | Start | Execute a job on a specified set of resource |
| Job | Cancel | Cancel an existing job |
| Job | Preempt/Resume | Suspend, Resume, Checkpoint, Restart, or Requeue a job |
| Node | Query | Collect detailed state, configuration, and utilization information about compute resources |
| Node | Modify | Change node state and/or attributes |
| Queue | Query | Collected detailed policy and configuration information from the resource manager |

Using these functions, the scheduler 302 is able to fully manage workload, resources, and cluster policies: Beyond these base functions, other commands exist to support advanced features such a dynamic job support, provisioning, and cluster level resource management.

In general, the scheduler 302 interacts with resource managers 310 in a sequence of steps in each scheduling iteration. These steps comprise: loading global resource information, loading node specific information (optional), loading job information, loading queue/policy information (optional), cancel/preempt/modifying jobs according to cluster policies, starting jobs in accordance with available resources and policy constraints and handling user commands. Typically, each step completes before the next step is started. However, with current systems, size and complexity mandate a more advanced parallel approach providing benefits in the areas of reliability, concurrency, and responsiveness.

A number of the resource managers a workload manager interfaces to were unreliable to some extent. This resulted in calls to resource management API's with exited or crashed taking the entire scheduler with them. Use of a threaded approach would cause only the calling thread to fail allowing the master scheduling thread to recover. Additionally, a number of resource manager calls would hang indefinitely, locking up the scheduler. These hangs could likewise be detected by the master scheduling thread and handled appropriately in a threaded environment.

As resource managers grew in size, the duration of each API global query call grew proportionally. Particularly, queries which required contact with each node individually became excessive as systems grew into the thousands of nodes. A threaded interface allows the scheduler 302 to concurrently issue multiple node queries resulting in much quicker aggregate RM query times.

In the non-threaded serial approach, the user interface is blocked while the scheduler updated various aspects of its workload, resource, and queue state. In a threaded model, the scheduler could continue to respond to queries and other commands even while fresh resource manager state information was being loaded resulting in much shorter average response times for user commands.

Under the threaded interface, all resource manager information is loaded and processed while the user interface is still active. Average aggregate resource manager API query times are tracked and new RM updates are launched so that the RM query will complete before the next scheduling iteration should start. Where needed, the loading process uses a pool of worker threads to issue large numbers of node specific information queries concurrently to accelerate this process. The master thread continues to respond to user commands until all needed resource manager information is loaded and either a scheduling relevant event has occurred or the scheduling iteration time has arrived. At this point, the updated information is integrated into the scheduler's 302 state information and scheduling is performed.

The present invention allows distribution of data probes and distribution of activators and cluster functionality such that one can have piecemeal upgrades to the cluster environment and piecemeal improvements without having to remove and replace the entire system. Other advantages include the capability of bringing in non-standard cluster resources. An administrator can define new resources in a matter of minutes and have those resources manipulated and scheduled to receive jobs. The administrator can add new network management directly for a router, regardless of what the resource manager 310 supports and that network management service can be incorporated into the overall cluster management scheme.

The administrator can pick and choose the components provided by various vendors or open source solutions and get exactly what is needed. The components do not need to be vendor specific to communicate with a particular proprietary resource manager 310. The present invention enables a free cluster management environment and if there are pieces of information need to be provided by a particular service or resource scheduler, the present invention utilizes that information to seamlessly incorporate the various services and resources for control from a single location.

Examples of various resource management vendors or products include provisioning management services such as Red Carpet™, Cluster Systems Management (CSM) from IBM, and open source tools or other multiple other automatic node configuration management systems. Such available services may also be connected directly in with RAM root and an NFS system to simply reboot and nothing more). Services such as the provisioning manager 306 could either be one of those tools mentioned above of it could be 5 lines or ten lines of Perl code that has the same effective action.

Another advantage to the multi-resource management invention is that many of these services can be written by hand or written in scripts in a few hours to meet specific needs and thus enable new functionality and new policies. For example, the flexibility of the present invention enabled a network manager created from one line of source code to retrieve additional information about network load that is pertinent to scheduling. That information is made available to the scheduler according to the principles of the present invention but would not be available to other resource managers.

With a storage manager 312, each of the major storage systems 320 provides some level of storage management but in the prior art these are not integrated into any resource manager 310. Therefore, if an administrator wanted storage management, there was no previous manner of performing that task via a resource manager. Whereas with the model disclosed herein, the administrator can obtain a storage manager 312 from the storage management vendor and can interface with his tool and allow the scheduler 310 to intelligently manage the data and the storage right along with the submitted jobs.

The scheduler 302 can create a resource manager by simply writing a script and having it executed by loading that information straight into a file, by having the information put into an SQL database, or even making the information available via a webservice, and having the scheduler 302 obtain the information directly over the Internet.

Another aspect of the present invention relates to on-demand services. The current state of the art is when resources are being re-provisioned or reconfigured, certain services will unavailable for a portion of that time frame. For example, a resource management client 120A, 120B, 120C, 120D would be down on that respective node 108A, 108B, 108C, 108D while it is being re-provisioned. With the scheduler disclosed herein having the multi-resource manager capability, multiple sources can provide redundant information so that while one resource manager 310 is down you have another source of information that reports that this node is being re-provisioned and moving forward on the desired path. This redundant information not only handles false but it also handles these situations in which not all resource managers can report all information at all times.

Figure 5:
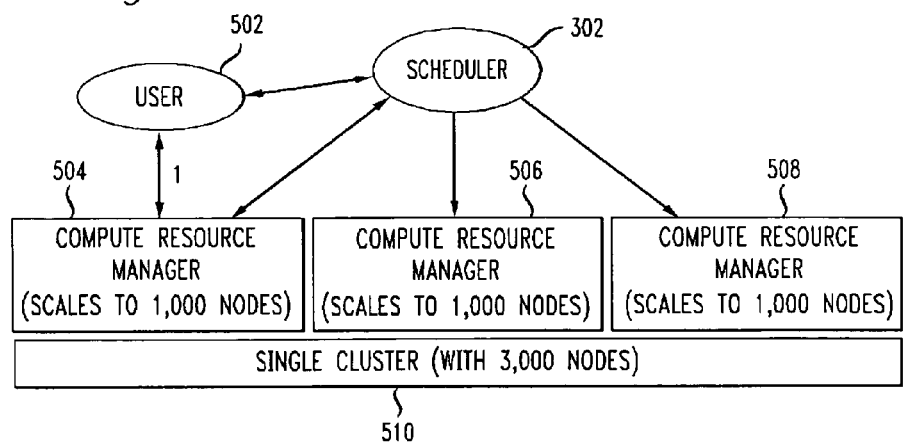
FIG. 5 illustrates a scheduler communicating with a plurality of compute resource managers managing a cluster.

FIG. 3 includes nodes 108A, 108B, 108C and 108D which can be defined as a single cluster. Another aspect of the multi-resource manager is how it operates on a multi-cluster platform. This aspect is shown by way of example in FIG. 5. The present invention supports multiple resource managers in order to increase scalability of what a resource manager can manage within multiple partitions of a very large cluster. Compute resource managers such as Loadleveler, LSF, OpenPBS, TORQUE, PBSPro, etc., may have a scalability limitation, in that a single instance of a compute resource manager may only be able to manage workload submission and node status cracking across a limited number of compute nodes. For example, compute resource manager 504 can manage job submission of up to 1,000 compute nodes. The customer has a 3,000 compute node cluster 510. The customer may set up 3 separate instances 504, 506, 508 of the compute resource manager to manage 1,000 compute nodes each. Then using this aspect of multi-resource management, a tool is used to manage workload, policies, scheduling, monitoring and reporting across all three compute resource managers as though they were one. Thus a user 502 may submit a job that requires more than 1,000 nodes to the scheduler 302 without the freedom to know that the scheduler will manage the job correctly over the cluster, even given the limitations of the individual resource managers.

Inquiries or requests that are placed from any one of the three portions of the overall cluster, or directly to the centralized tool, can be applied any one of the three portions of the cluster no matter where they originated. Policies on the centralized tool however could set rules that disallowed work requests from one portion to be applied to another portion or any number of policies based on the origin and destination of the request.

Another aspect of the present invention is its support for multiple resource managers in order to manage multiple clusters in a local area grid from one tool. Consequently, the resource management configuration parameter (RMCFG) takes an index value, i.e., RMCFG[clusterA] TYPE=PBS. This index value essentially names the resource manager (as done by the deprecated parameter RMNAME.) The resource manager name is used by the scheduler in diagnostic displays, logging, and in reporting resource consumption to the allocation manager. For most environments, the selection of the resource manager name can be arbitrary or not.

Figure 6:
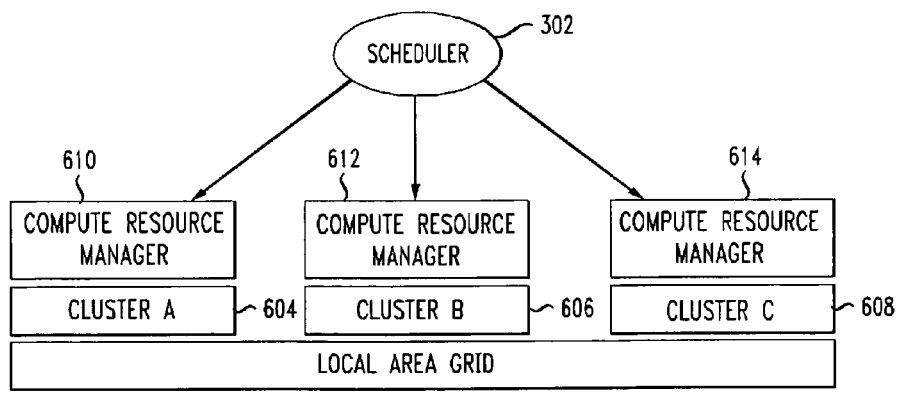
FIG. 6 illustrates a scheduler communicating with a plurality of compute resource managers each managing a separate duster that comprises a grid.

This feature is illustrated in FIG. 6. When an organization has multiple clusters 604, 606, 608 and would like to use those clusters in a more aggregated manner, a tool may be used to combine the management of resources on each cluster through its local compute resource manager 610, 612, 614. In this example, each resource manager is of the same type. An example of this would be an organization that has 3 clusters at a similar location, each being used by a different group. Each cluster 604, 606, 608 is using a respective compute resource manager 610, 612, 614. The workload manager 302 of the present invention may be used to provide unified management of all clusters and can allow any user from any one cluster to submit work to any other cluster, or to submit the work to the local area grid (pool of all three clusters combined or a portion of all three clusters) in which case the workload manager would make the decision as to where best to submit the job request. This creates a local area grid 602.

Another aspect of the workload manager is its support for multiple resource managers of different types for purposes of managing a heterogeneous set of clusters. This aspect is very similar to that of the aspect described above with reference to FIG. 6, although this is done also for the purpose of combining multiple types of compute resource managers. Therefore, in this example, resource managers 610, 612, 614 are of different types to allow different groups that have an investment or an affinity to a particular resource manager to continue with that investment or affinity while still providing a unified management mechanism through the present invention.

An issue that is raised with the capabilities of the present invention is how to handle conflicting information regard a node, job or policy. The scheduler 302 in this regard does not trust resource manager 310 information. To obtain the most reliable information, node, job, and policy information is reloaded on each iteration and discrepancies are detected. Synchronization issues and allocation conflicts are logged and handled where possible. To assist sites in minimizing stale information and conflicts, a number of policies and parameters are available: Node State Synchronization Policies (such as NODESYNCTIME); Job State Synchronization Policies (see JOBSYNCTIME); Stale Data Purging (sec JOBPURGETIME); Thread Management (preventing resource manager failures from affecting scheduler operation); Resource Manager Poll Interval (see RMPOLLINTERVAL); Node Query Refresh Rate (see NODEPOLLFREQUENCY).

Embodiments within the scope of the present invention may also include computer-readable storage media for carrying or having computer-executable instructions or data structures stored thereon. Such computer-readable storage media can be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A computer-readable storage device or medium excludes signals per se, energy, the air interface and any other non-statutory subject matter. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. The scheduler source code related to the invention is preferably written in C code and operates on a separate server but there are no limitations on the software source code language or any particular hardware configuration. Other configurations of the described embodiments of the invention are part of the scope of this invention. Accordingly, the appended claims and their legal equivalents should only define the invention, rather than any specific examples given.

I claim:

1. A method comprising:
   defining a resource management interface for each resource manager of a plurality of different resource managers being of a different type and having different capabilities with respect to communication with a certain type of resource;
   wherein each resource manager communicates with a plurality of logical or physical resources within a compute environment;
   a workload manager communicates with a respective resource manager to schedule a consumption of resources within the compute environment by workload;
   each resource manager is at a same hierarchal level in the compute environment;
   determining a set of services available from each resource manager of the plurality of different resource managers to yield sets of services;
   selecting a group of services available from the sets of services;
   contacting the group of services to obtain information associated with the compute environment; and
   integrating the information into a view of compute resources in the compute environment and workload requests.

2. The method of claim 1, further comprising resolving conflicts in the information.

3. The method of claim 2, wherein resolving the conflicts comprises applying one of a policy and a parameter.

4. The method of claim 3, wherein the policy is one of a node state synchronization policy, a job state synchronization policy, a stale data purging policy, a thread management policy, a resource manager poll interval policy and a node query refresh rate policy.

5. The method of claim 1, further comprising performing tasks based the view of the compute resources using the group of services.

6. The method of claim 5, wherein performing tasks is further based on policies.

7. The method of claim 1, further comprising ignoring any data obtained from the plurality of different resource managers.

8. The method of claim 1, further comprising overwriting any data obtained from the plurality of resource managers.

9. The method of claim 1, further comprising performing arbitrary operations on data when integrating the information into the view.

10. The method of claim 1, wherein identifying a location of each of the plurality of resource managers further comprises determining where each resource manager is and how to communicate with each resource manager.

11. The method of claim 1, wherein determining the set of services available from each of the plurality of resource managers comprises one of: explicitly receiving from a file the services and/or data available, implicitly determining the services available and dynamically determining the services available.

12. The method of claim 1, further comprising defining a type for each of the plurality of resource managers, wherein determining the set of services available from each of the plurality of resource managers is implied based on the type associated with each resource manager.

13. The method of claim 1, further comprising scheduling and managing the compute resources using the view.

14. The method of claim 1, wherein the information comprises compute resources state information.

15. The method of claim 1, wherein the method is practiced by a scheduler.

16. The method of claim 1, wherein the compute environment relates to at least one of a local area grid, a cluster environment, a data center, a wide area grid, a cluster scheduler utility-based computing environment and hosted computing centers.

17. The method of claim 1, wherein contacting the group of resource managers further comprises contacting a plurality of single-resource-type resource managers, including, but not limited, a software manager, a network manager, license manager, a data storage manager and a compute resource manager.

18. A system for providing multiple-source resource management of a compute environment, the system comprising:
a processor; and
a non-transitory computer-readable storage medium storing instruction which, when executed by the processor, cause the processor to perform operations comprising:
defining a resource management interface for each resource manager of a plurality of different resource managers being of a different type and having different capabilities with respect to communication with a certain type of resource, wherein;
each resource manager communicates with a plurality of logical or physical resources within a compute environment;
a workload manager communicates with a respective resource manager to schedule a consumption of resources within the compute environment by workload;
each resource manager is at a same hierarchal level in the compute environment;
determining a set of services available from each resource manager of the plurality of different resource managers to yield sets of services;
selecting a group of services available from the sets of services;
contacting the group of services to obtain information associated with the compute environment; and
integrating the obtained information into a view of compute resources in the compute environment and workload requests.

19. The system of claim 18, wherein the non-transitory computer-readable storage medium storing further instructions which, when executed by the processor, cause the processor to perform operations further comprising:
performing tasks based the view of compute resources using the group of services.

20. The system of claim 19, wherein performing tasks further comprising performing the tasks based on policies.

21. The system of claim 18, wherein the non-transitory computer-readable storage medium stores further instructions which cause the processor to perform operations further comprising:
ignoring any data obtained from the plurality of resource managers.

22. The system of claim 18, wherein the non-transitory computer-readable storage medium stores further instructions which cause the processor to perform operations further comprising:
overwriting any data obtained from the plurality of resource managers.

23. The system of claim 18, wherein the non-transitory computer-readable storage medium stores further instructions which cause the processor to perform operations further comprising:
performing arbitrary operations on data when integrating the information into the view.

24. The system of claim 18, wherein the computer-readable storage medium stores further instructions which cause the processor to perform operations further comprising:
identifying a location of each of the plurality of resource managers further comprises determining where each resource manager is and how to communicate with each resource manager.

25. The system of claim 18, wherein determining the set of services available from each of the plurality of resource managers further comprises explicitly receiving from a file the services and/or data available, implicitly determining the services available or dynamically determining the services available.

26. The system of claim 18, wherein the non-transitory computer-readable storage medium stores further instructions which cause the processor to perform operations further comprising:
defining a type for each of the plurality of resource managers, wherein determining the set of services available from each of the plurality of resource managers is implied based on the type associated with each resource manager.

27. The system of claim 18, wherein the non-transitory computer-readable storage medium stores further instructions which cause the processor to perform operations further comprising:
scheduling and managing the compute resources using the view.

28. The system of claim 18, wherein the information comprises compute resources state information.

29. The system of claim 18, wherein the compute environment relates to at least one of a local area grid, a cluster environment, a data center, a wide area grid, a cluster scheduler utility-based computing environment and hosted computing centers.

30. The system of claim 18, wherein contacting the group of resource managers further comprises contacting a plurality of single-resource-type resource managers, including, but not limited, a software manager, a network manager, license manager, a data storage manager and a compute resource manager.

31. A computer-readable storage device containing instructions for controlling a computing device to provide multiple-resource management of a compute environment, the instructions causing the computing device to perform operations comprising:
defining a resource management interface for each resource manager of a plurality of different resource managers being of a different type and having different capabilities with respect to communication with a certain type of resource, wherein;
each resource manager communicates with a plurality of logical or physical resources within a compute environment;
a workload manager communicates with a respective resource manager to schedule a consumption of resources within the compute environment by workload;
each resource manager is at a same hierarchal level in the compute environment;
determining a set of services available from each resource manager of the plurality of different resource managers to yield sets of services;
selecting a group of services available from the sets of services;
contacting the group of services to obtain information associated with the compute environment; and
integrating the obtained information into a view of compute resources in the compute environment and workload requests.

32. The computer-readable storage device of claim 31, wherein the instructions further comprise performing tasks based on cluster policies and the view of cluster resources.

* * * * *